R. H. FOLSOM.
INTERNAL COMBUSTION ENGINE AND METHOD FOR CONTROLLING COMBUSTION THEREIN.
APPLICATION FILED AUG. 23, 1919.
1,415,025. Patented May 9, 1922.
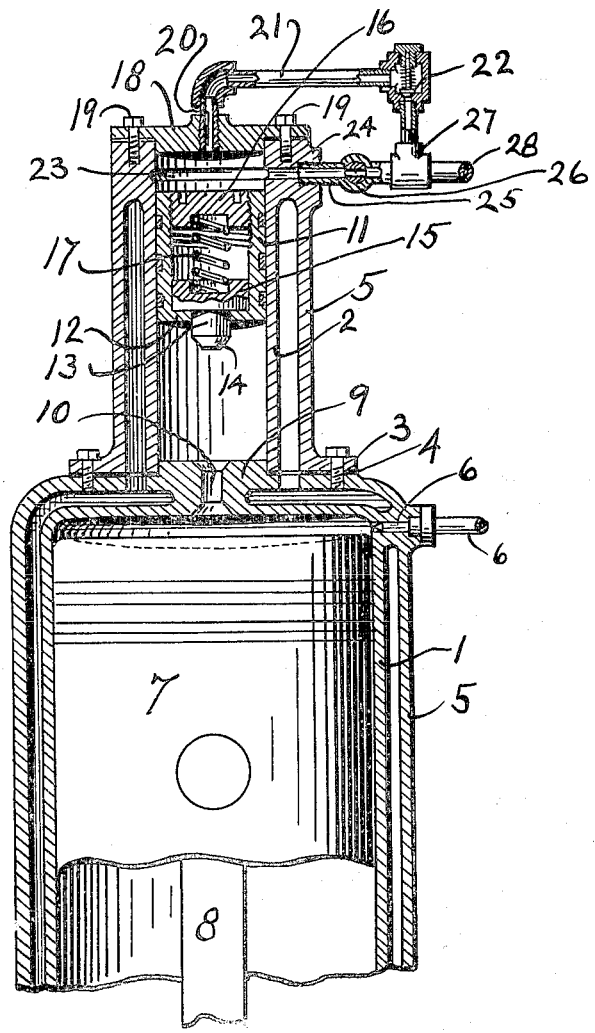
INVENTOR
Robert H. Folsom
by his attorney
J. Edward Thebaud

UNITED STATES PATENT OFFICE.

ROBERT H. FOLSOM, OF BUFFALO, NEW YORK, ASSIGNOR TO WORTHINGTON PUMP AND MACHINERY CORPORATION, OF NEW YORK, N. Y., A CORPORATION OF VIRGINIA.

INTERNAL-COMBUSTION ENGINE AND METHOD FOR CONTROLLING COMBUSTION THEREIN.

1,415,025. Specification of Letters Patent. Patented May 9, 1922.

Application filed August 23, 1919. Serial No. 319,457.

*To all whom it may concern:*

Be it known that I, ROBERT H. FOLSOM, a citizen of the United States, residing at Buffalo, in the county of Erie and State of New York, have invented certain new and useful Improvements in Internal-Combustion Engines and Methods for Controlling Combustion Therein; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to internal combustion engines, particularly to auxiliary means for increasing the power of a given size of engine, and to methods of controlling combustion therein.

This invention has been devised particularly for use in connection with fuel injected engines.

The usual type of combustion engine with its piston reciprocating within a cylinder, wherein the explosive charge, once received, is ignited at or very near to the starting point of the power stroke of the piston and then left to complete its work within the increasing size of the combustion chamber, as the piston moves forward does not afford sufficient means for handling the explosive charge to advantage for its best economic use in producing power.

Therefore one of the objects of my invention is to provide auxiliary means for improving the power output of a given size of combustion engine, without changing its main parts.

A further object is to effect a saving in weight per horse power of an engine by adding means for increasing its power output.

In present types of fuel injection engines the rate of combustion is controlled by controlling the rate of the injection of the fuel into the increasing combustion space existing between the cylinder head and the crown of the descending piston. In engines of this type, the incoming fuel being in a state of mere subdivision, and having a very slight mass as compared to that of the air which it is entering, its inertia is almost instantly overcome by the resistance due to the density of this air. Besides which we have the vaporization of the small globules of fuel presenting greater resistance in said air.

The tendency of this vaporized fuel to become stratified, while not coming into contact with sufficient oxygen for complete and immediate combustion, results in a burning of the first portion of fuel entering at such a distance from the injection valve, which depends upon its initial velocity. As the injection of fuel continues, the subsequent portions of fuel entering, naturally reach the same degree of distance from the point of injection and the entire charge has a tendency to stratify and burn incompletely.

In engines in which the fuel is injected along with highly compressed air, the incoming air, due to its sudden drop in pressure has a refrigerating effect upon the fuel and upon the air in the combustion space. This incoming compressed air has necessitated the expenditure of considerable energy for its precompression, and it also requires a compressor for supplying a large percentage of the total air, supplementing the volumetric capacity of the engine.

The conditions that tend to give rise to faulty combustion and stratification of the charge, I overcome by creating within the combustion space, a highly explosive gaseous vapor, compelling the gaseous vapor to seek out the oxygen it requires, and I am thus enabled to control the rate at which the oxygen is presented.

This additional incoming air cannot be advantageously used for burning an additional quantity of fuel early in the stroke or immediately at the time that the accompanying fuel enters, since it not only must absorb heat before it is brought to the temperature required for union with the fuel, but it also seeks to remain apart from combustion with the accompanying fuel, in accordance with a known law that two bodies such as fuel and air moving together at the same velocity tend to hold themselves stratified or apart and not to co-mingle.

For engines of the type in which the fuel is injected against a heated surface, or into a heated layer of air in proximity to a heated surface, the fuel does not ignite until it reaches the heated area, and the latter portion of the injected fuel enters a zone complete with products of combustion and has a tendency to become disassociated and deposit upon the walls or remain inert in this zone without finding sufficient oxygen for its consumption.

A further object of my invention is to control combustion by controlling the rate at which larger quantities of atmospheric air enter the combustion space and to dispense with the necessity of taking large quantities of highly precompressed air from some internal source.

With these and other objects my invention resides in certain construction one embodiment of which is illustrated in the figure, is hereinafter described, my theory of its operation is explained and what I claim is set forth.

The figure shows a diametral longitudinal section of an engine cylinder and injection nozzle together with attachments embodying my invention.

In the figure, the cylinder 1 is shown to have mounted thereon an auxiliary cylinder 2 secured thereto by the flange 3, between which and the cylinder 1 is a gasket 4. Surrounding both cylinders is a water jacket 5. Passing through the jacketed wall of the cylinder 1 is an injecting nozzle 6. Within the cylinder 1 reciprocates the piston 7. Any kind of valve control at the intake and exhaust ports may be used, and therefore it is not necessary to show here a complete operative engine. The piston rod is marked 8.

The head 9 of the cylinder 1 has a port 10 leading into the cylinder 2. Within the cylinder 2 is the reciprocating piston 11, through the bottom 12, of which, passes a reciprocating valve stem 13, having a conical end 14 adapted to close the port 10 as the piston 11 descends. The valve stem 13 is fixed or integral with a plunger 15 which slidingly engages the inner wall of the piston 11. A cap 16 is screwed into the upper end of the hollow piston 11. Between the cap 16 and the plunger 15 is a compression spring 17. The upper end of the cylinder 2 is closed by the flanged head 18, held on by screws 19 there being a gasket between it and the cylinder 2. Screwed into the head 18 is the nipple 20, connected by piping 21 to a check valve 22 which is normally open toward the chamber of the cylinder 2. In the upper part of the cylinder 2 is an annular recess 23 communicating through the wall boss 24 with piping 25 connected with a shut-off 26, which is connected by piping 27 with the check valve 22. Both of the valves 26 and 22 are connected by a pipe 28 with an air pressure main.

The operation of the parts above described and the method of controlling the combustion of the fuel therein may be described as follows: The engine piston 7 is shown in the drawing to be at the top of its stroke, and in this position the charge is at the greatest pressure the instant prior to ignition which is about to take place. The piston 11, at the same time has been forced by the pressure below it, to go upward against the air pressure in the upper end of the cylinder 2, coming from the pressure supply main, through the piping 27, this valve 26 being open. The chamber capacity thus created below the piston 11, by its upward passage, forms a reservoir for part of the compressed charge of air, which has formed its way through the port 10.

Fuel is now injected into that portion of the compressed air charge immediately above the piston 7, and finding its way in only a portion of the full compressed charge left in the cylinder 1, there results a rich mixture which is ignited. If pressure is increased by the ignition of this rich mixture, the same is relieved by passing through the port 10, into the cylinder cavity below the piston 11, and the energy exerted thereby is carried into the reserved compressed air charge to be later restored into the chamber above the piston 7, at the same time, the inertia of the piston and its attached parts is effected and its upward movement is accelerated, causing the edge of the piston 11 to eclipse the lips of the annular recess 23 shutting off the air supply, pocketing the air above the piston 11 against the cylinder head 18. The check valve 22 holds the pocketed air against returning through the piping 21, as a by pass to the pressure supply main, and acts as a cushion to arrest the up-coming movement of the piston 11 to avoid knocking and at the same time resiliently store part of the energy which has come with the increased pressure into the cylinder 2, directly after ignition.

As the engine piston 7 starts to move downward, the volumetric space above its end within the cylinder 1, increases, causing a partial decrease in pressure, which the compressed charge beneath the piston 11 seeks to restore through the port 10, in response to the pressure above the piston 11, until communication with the air pressure main is opened up by the descent of the piston 11 below the annular recess 23. There is then reestablished a constant, but resilient, pressure back of the piston 11, to cause the same to follow up any decrease of pressure in the cavity below it within the cylinder 2, to continue the flow of the stored compressed air charge into the main cylinder 1, constantly feeding the compressed air to continuously support combustion in the cavity above the piston 7, as the same descends, setting up a variety of currents, which brings about a better mixture, promoting combustion throughout the charge, resulting in the maintenance of combustion at a practically constant pressure upon the head of the piston 7.

The construction above described, is adaptable with properly coordinated design to almost any type of internal combustion engine, particularly that type using an injected fuel, and a modification of this construction even eliminating the piston 11, and the air pipe attachments, reserving only a chamber afforded by the cylinder 2, and its head 18 together with the port 10, will serve the purpose of a reservoir for part of the compressed charge above the piston 7 to flow back into the cylinder 1, as the piston 7 recedes, by virtue of its own pressure, under which condition the air in said cylinder 2 will supply combustion at a gradually decreasing pressure, and due to the restricted area of the port 10 said air will enter the combustion space with sufficient velocity to produce the required circulation of fuel and air.

As a substitute for the pneumatic pressure compensating effect produced by a supply of compressed air the piston 11 can be directly subjected to a fluid column, a spring or any other suitably resilient pressure exerting medium. Said piston 11 may be rigidly attached to a suitable connecting rod, which rod may be attached to another piston or plunger of the same or greater area acted upon by any suitably resilient medium, and in addition to the said resilient medium a mechanical means, such as a rocker arm and a cam may be used to accelerate or assist the movement of the said piston in either direction.

The cushioning effect, produced by the valve stem 13 closing the port 10 in advance, may, as a modification, be produced by having the piston eclipse an annular port in the manner shown at the upper end of cylinder, or a rod may be rigidly connected to said piston 11, and pass out through a stuffing box in the head 18 and connect with a dashpot, a spring or any other usual device for overcoming the inertia of a moving member.

The piston or movable wall may be rigidly connected with a rod actuated by a cam or crank so synchronized with the movement of the working piston, that the required volume will exist in the auxiliary air, reserving space at the time that compression is completed, and during the power stroke of the working piston, the auxiliary piston or movable wall may be caused to return the air to the combustion space at such a predetermined rate as to give the desired rate of combustion.

The piston or movable wall as shown in any of the modifications thereof that have been above referred to, serve as a means for accurately measuring the amount of air displaced from the combustion space and returning this same amount of air to the combustion space at the required rate.

Actual tests show conclusively that I am closely approximating the ideal condition of uniting the entire amount of oxygen, contained in the air charge, with the fuel. In present types of engines in which solid injection of fuel is employed, it is apparent that ordinarily only 50% of the new air entering the cylinder, per each stroke is used in combustion. Since my device increases the indicated horse power without increasing the mechanical losses, it follows that the brake horse power increase with my device is even greater proportionately and the net thermal efficiency is increased for this reason, and is further increased by the fact that the highly efficient constant pressure combustion is automatically maintained regardless of any decrease of fuel injected, such as at light loads.

Any portion of air may be retained within the combustion space at complete compression. When an engine is required to operate at high piston speed, I propose to retain the larger portion or practically all of the air within the combustion space and inject the fuel therein, in which case, rapid combustion will merely force the compensator piston outward, thereby instantly developing useful energy, which is imparted to the resilient pressure medium and then returned to the working piston in the manner described.

It will be observed that when the rapidly expanding gases partially find their way through the port between the main and auxiliary cylinder the compensator piston is forced outward and the unused portion of the specific heat of the whole charge is instantly converted into energy, which energy is absorbed by the resilient medium and then returned to the working piston. The fundamental principle of my device therefore, resides in having a resilient medium somewhat isolated from the main cylinder but in communication therewith through a port in the upper end of the main cylinder the resilient medium to be acted upon by the air or expanding charge in the combustion cylinder in such a manner that pressures within said combustion space cannot rise above a predetermined pressure, and that any force generated within the combustion space that would ordinarily tend to increase the internal pressures above the predetermined degree, is caused to act upon said resilient medium through a port and said resilient medium by its resiliency is adapted to receive the energy imparted to it; to conserve this energy in a practically isolated chamber and to redeliver this energy in an available form through a port when it (said resilient medium) resumes its normal state or otherwise redelivers through said port between the main and auxiliary cylinders the energy previously imparted to it.

The air in the auxiliary cylinder or space is at a temperature due to the heat of compression; except for a slight loss of heat that might occur from radiation, and this is small owing to the very limited interval of time for which it is retained; therefore as the reserved air returns to the combustion space the oxygen therein instantly unites with the fuel atoms, thereby developing heat. It is well known, that air pre-heated to high temperature brought in contact with a homogeneous combustible mass, results in the practically instantaneous union of the atoms of oxygen and the atoms of fuel.

Since my device gives combustion at constant pressure, even with highly rapid combustion, it is also adapted for use in internal combustion engines in which the fuel is thoroughly mixed with the air before compression by a carburetor or by advanced injection of the fuel. In this case I propose to maintain a pressure against the compensating piston in excess of the pressure at which the combustible mixture will ignite spontaneously, whereby at or about the period of complete compression of the combustible charge, said charge will ignite spontaneously and the sudden expansion of the charge will force the compensator piston outward in the manner described.

It will be also observed that when the injected fuel enters the combustion space, it will come in contact with only a portion of the entire air charge and it is obvious that this entering fuel does not mix thoroughly throughout the entire combustion space with whatever air is therein, combustion therefore, is incomplete and what fuel does find oxygen is partially consumed and turns to carbon monoxide. That portion of the fuel that cannot find oxygen is merely vaporized by the heat of the surrounding air and mixture. Owing to these conditions, no appreciable increase of heat, and therefore no appreciable expansion of the charge results. The combustion space therefore, contains a mixture of vaporized fuel, carbon monoxide and a portion of pure air. This mixture being at a temperature due to the heat of compression or slightly above it, the highly combustible rich initial mixture requires only the addition of oxygen bearing air together with a state of agitation to result in very complete combustion.

To further assist these ideal conditions, I cause the new air to return to the combustion space at a velocity sufficient to cause the said air to penetrate deep into the homogeneous mixture in the combustion space causing a constant agitation thereon and promoting a thorough mixing of fuel and air, particularly since the mixture in the combustion space is in a state of inertia before the air enters, and as the air enters it sets up numerous cross currents and the atoms have a greater tendency to unite than they ordinarily would if both air and fuel were entering the combustion together.

My method involves the reserving of a part of the whole air charge, entirely from the space in which combustion is to later occur; and involves the creating within the combustion space of a homogeneous rich mixture of combustible gases, by injecting a charge of fuel with a portion of air, that is not sufficient for the complete combustion; then regulating the rate at which complete combustion of a rich initial mixture is to occur, by returning the oxygen bearing air, previously displaced, to the combustion space at a pre-determined rate, and thereby constantly diluting this rich mixture with oxygen, which dilution causes continued combustion.

In conjunction with any methods of operation described, instead of constant pressure combustion I may so control combustion that it will occur with constantly decreasing pressure, such as occurs for instance in isothermal expansion. This is accomplished by closing the manually operated valve. This causes the pressure of the air behind the piston 11 to gradually increase in pressure as said piston moves outward. When the working piston 7 descends on its power stroke, air is returned to support combustion at a gradually decreasing pressure rate.

Having described my invention I claim,

1. In an internal combustion engine having a combustion chamber, and a reciprocating piston, an auxiliary cylinder, a wall between said cylinder and said chamber, a port in said wall through which the auxiliary cylinder is in communication with said combustion chamber said cylinder having a capacity sufficient to temporarily reserve only a part of the charge of air compressed by one stroke of the piston to be redelivered to said combustion chamber, through said port, during the next preceding stroke of the piston, and means for introducing fuel into said combustion chamber prior to and independently of the redelivery of the reserve air.

2. In an internal combustion engine having a combustion chamber, and a reciprocating piston, an auxiliary cylinder, a wall between said cylinder and said chamber, a port in said wall, through which the auxiliary cylinder is in communication with said combustion chamber, said cylinder having a capacity sufficient only to temporarily reserve part of a charge of air compressed by one stroke of said piston, to be redelivered to said combustion chamber, through said port, upon the next receding stroke of said piston, a movable wall to said auxiliary cylinder, having resilient means bearing inward upon said wall, whereby the pressure of the reserved charge of air within said auxiliary cylinder is maintained.

3. In an internal combustion engine having a combustion chamber, and a reciprocating piston, a wall at the compression end of said chamber, an auxiliary closed cylinder in communication with said combustion chamber through a port, said cylinder having a capacity sufficient only to temporarily reserve part of a charge of air compressed by one stroke of said piston, to be redelivered to said combustion chamber, through said port, upon the next receding stroke of said piston, a movable wall to said auxiliary cylinder having resilient means bearing inwardly upon said wall, whereby a pressure is maintained within said auxiliary cylinder, and cushioning means for absorbing the inertia of said movable wall near the end of its stroke.

4. In an internal combustion engine having a combustion chamber, an auxiliary cylinder communicating with said chamber through a port, a piston adapted to reciprocate within said auxiliary cylinder, and means upon said piston adapted to close said port near the end of the discharge stroke of said piston to cushion the same.

5. In an internal combustion engine having a combustion chamber, an auxiliary cylinder communicating with said chamber through a port, a piston adapted to reciprocate within said auxiliary cylinder, a valve stem passing outward from piston adapted and positioned to close said port in advance of the termination of the discharge stroke of said piston, and resilient means for normally holding said stem out from said piston.

6. In an internal combustion engine having a combustion chamber, an auxiliary cylinder communicating with said chamber through a port, a piston adapted to reciprocate within said auxiliary cylinder, a valve stem passing outward from the piston, positioned to close said port in advance of the termination of the discharge stroke of said piston, resilient means for normally holding said stem out from said piston, and an annular recess for being eclipsed to pocket cushioning air.

7. In an internal combustion engine, the combination with a cylinder provided with a combustion space, and a reciprocating piston, whereby an air charge may be compressed by the piston, of means for reserving a substantial portion of such compressed air in restricted communication with the combustion space, means for admitting fuel to the combustion space independently of the admission of said reserved air, and resilient means for returning all of said reserved air to the combustion space after ignition of the charge in said combustion space.

8. In an internal combustion engine, the combination with a cylinder provided with a combustion space, and a reciprocating piston whereby an air charge may be compressed by the piston, of means for reserving a substantial portion of such compressed air in restricted communication with the combustion space, means for admitting fuel to the combustion space independently of the admission of said reserved air, and resilient means for returning all of said reserved air to the combustion space under a predetermined pressure after ignition of the charge in said combustion space.

9. The method of controlling combustion within the combustion chamber of an internal combustion engine, which consists in providing said chamber with a compressed main charge comprising a charge of air and a fuel charge, and during the working stroke feeding to the combustion chamber a predetermined additional charge comprising air, the main charge being ignited before the additional charge is fed in.

10. The method of controlling combustion within the combustion chamber of an internal combustion engine, which consists in providing said chamber with a compressed main charge comprising a charge of air and a fuel charge, and during the working stroke forcing into the combustion chamber at a substantially constant pressure an additional charge comprising air, the main charge being ignited before the additional charge is forced in.

11. The method of controlling combustion within the combustion chamber of an internal combustion engine, which consists in providing two charges of compressed air, one constituting the cylinder charge behind the working piston and the other a reserve charge, charging only the cylinder charge with fuel whereby a slow combustion begins, and during the working stroke returning all the reserve charge of air to the cylinder charge.

12. The method of controlling the combustion within the combustion chamber of an internal combustion engine, which consists in supplying a properly proportioned working charge to the combustion chamber in three stages, first, a predetermined portion of the charge of compressed air, then the complete fuel charge, and thereafter, and after ignition has commenced and the working stroke begins gradually supplying a fixed amount of compressed air constituting the remainder of the air charge.

13. The method of controlling the combustion within the combustion chamber of an internal combustion engine, which consists in supplying a properly proportioned working charge to the combustion chamber in three stages, first, a predetermined portion of the charge of compressed air, then the complete fuel charge, and thereafter, and after ignition has commenced and the working stroke begins, gradually supplying under substantially constant pressure a fixed amount of compressed air constituting the remainder of the air charge.

14. The method of controlling combustion within the combustion chamber of an internal combustion engine, which consists in providing said chamber with a compressed charge comprising a charge of air and the desired fuel charge required for the working stroke, and during the working stroke progressively feeding to the combustion chamber a predetermined additional supply of compressed air, the compressed charge being ignited before the additional supply of air is fed in.

ROBERT H. FOLSOM.